US010514532B1

(12) United States Patent
Cramb et al.

(10) Patent No.: US 10,514,532 B1
(45) Date of Patent: Dec. 24, 2019

(54) CONFOCAL MICROSCOPE HAVING A POSITIONABLE IMAGING HEAD MOUNTED ON A BOOM STAND

(71) Applicant: CALIBER IMAGING & DIAGNOSTICS, INC., Rochester, NY (US)

(72) Inventors: Allison L. Cramb, Rochester, NY (US); Christopher C. Distasio, Rochester, NY (US); William J. Fox, Rochester, NY (US); Steven Ridge, Glen Ellyn, IL (US); Christopher J. Lundgren, Naples, NY (US)

(73) Assignee: CALIBER IMAGING & DIAGNOSTICS, INC., Rochester, NY (US)

( * ) Notice: Subject to any disclaimer, the term of this patent is extended or adjusted under 35 U.S.C. 154(b) by 99 days.

(21) Appl. No.: 15/277,380

(22) Filed: Sep. 27, 2016

Related U.S. Application Data

(60) Provisional application No. 62/233,407, filed on Sep. 27, 2015.

(51) Int. Cl.
*G02B 21/00* (2006.01)
*G02B 21/02* (2006.01)
*G02B 21/26* (2006.01)

(52) U.S. Cl.
CPC ......... *G02B 21/0036* (2013.01); *G02B 21/02* (2013.01); *G02B 21/26* (2013.01)

(58) Field of Classification Search
CPC .. G02B 21/00; G02B 21/0004; G02B 21/241; G02B 21/242; G02B 21/248; G02B 21/26
USPC .......................... 359/368, 382–384, 391–394
See application file for complete search history.

(56) References Cited

U.S. PATENT DOCUMENTS

| | | | |
|---|---|---|---|
| 5,034,613 | A | 7/1991 | Denk et al. |
| D354,761 | S | 1/1995 | Komatsuzaki et al. |
| 5,532,874 | A | 7/1996 | Stein |
| 5,788,639 | A | 8/1998 | Zavislan et al. |
| 5,820,623 | A | 10/1998 | Ng |

(Continued)

FOREIGN PATENT DOCUMENTS

| CN | 1349122 A | 5/2002 |
|---|---|---|
| EP | 0293228 | 11/1988 |

OTHER PUBLICATIONS

VivaScope(R) 1500/3000, MAVIG GmbH, 2011.

(Continued)

*Primary Examiner* — Robert E. Tallman
(74) *Attorney, Agent, or Firm* — Kenneth J. Lukascher Law Group; Kenneth J. LuKacher

(57) ABSTRACT

A confocal microscope is provided having an imaging head with an optical system for capturing optically formed microscopic sectional images of a sample, and a boom stand having a platform, a shaft which extends from the platform, and an arm which extends from the shaft, where such arm is coupled to the imaging head. The imaging head has a plurality of degrees of freedom of motion in positioning the arm relative to the shaft, and the imaging head relative to the arm, so that the imaging head in a first mode can be moved to image a first sample, such as ex-vivo tissue specimen mounted on a stage, disposed upon the platform, and in a second mode the imaging head can be moved to image a second sample, such as in-vivo issue, disposed away from or beside the platform.

17 Claims, 16 Drawing Sheets

(56) References Cited

U.S. PATENT DOCUMENTS

| | | | |
|---|---|---|---|
| 5,861,983 A | 1/1999 | Twisselman | |
| 5,880,880 A | 3/1999 | Anderson et al. | |
| 5,982,532 A | 11/1999 | Mittelstadt et al. | |
| 6,137,628 A * | 10/2000 | Kraft | G02B 21/22 359/388 |
| 6,330,106 B1 | 12/2001 | Greenwald et al. | |
| 6,411,434 B1 | 6/2002 | Eastman et al. | |
| 6,434,416 B1 | 8/2002 | Mizoguchi et al. | |
| D492,997 S * | 7/2004 | DiStasio | D24/158 |
| D523,883 S | 6/2006 | Distasio et al. | |
| 7,227,630 B1 | 6/2007 | Zavislan et al. | |
| 7,394,592 B2 | 7/2008 | Fox et al. | |
| 7,564,625 B2 | 7/2009 | McLeod et al. | |
| 7,864,996 B2 * | 1/2011 | Hemmer | G02B 21/0012 382/128 |
| D690,342 S | 9/2013 | Funakoshi et al. | |
| 9,055,867 B2 | 6/2015 | Fox et al. | |
| 9,229,210 B2 | 1/2016 | Fox et al. | |
| D771,169 S | 11/2016 | Weber | |
| D784,433 S | 4/2017 | Weber | |
| D812,665 S | 3/2018 | Lein et al. | |
| 2004/0133112 A1 * | 7/2004 | Rajadhyaksha | A61B 5/0059 600/476 |
| 2005/0213201 A1 * | 9/2005 | Zimmermann | G02B 7/001 359/368 |
| 2007/0160279 A1 * | 7/2007 | Demos | A61B 5/0071 382/133 |
| 2007/0236786 A1 * | 10/2007 | McLeod | G02B 21/0016 359/384 |
| 2008/0151368 A1 | 6/2008 | Weiss | |
| 2012/0162602 A1 | 6/2012 | Huening et al. | |
| 2016/0231552 A1 | 8/2016 | Hein | |

OTHER PUBLICATIONS

VivaScope(R), MAVIG GmbH, 2011.
VivaScope(R) 2500 Multilaser, MAVIG GmbH, 2010.
Schmitt, Joseph M. et al., "Optical characterization of dense tissues using low-coherence interferometry," Proc. of SPIE, vol. 1889, pp. 197-211, 1993.
Rajadhyaksha, Milind et al., "In vivo Confocal Scanning Laser Microscopy of Human Skin: Melanin Provides Strong Contrast," The Journal of Investigative Dermatology, vol. 104, No. 6, pp. 946-952, Jun. 1995.
Rajadhyaksha, Milind et al., "Confocal laser microscope images tissue in vivo," Laser Focus World, pp. 119-127, Feb. 1997.
Stereo Microscope Boom Stands, Diagnostic Instruments, Inc., Catalog #BS-3, 2003.
Dual Linear Ball Bearing Arm, Old School Industries, Inc., http://www.osi-incorp.com/productdisplay/dual-linear-ball-bearing-arm, printed Sep. 25, 2015.
Scanning Stages with Integrated Measuring System, Märzhäuser Wetzlar GmbH Co. KG, http://www.marzhauser.com/en/products/microscope-stages/motorized-microscope-stages/scanplus-series.html, Sep. 7, 2015.

* cited by examiner

CONFOCAL MICROSCOPE HAVING A POSITIONABLE IMAGING HEAD MOUNTED ON A BOOM STAND

This application claims priority to U.S. Provisional Patent Application No. 62/233,407, filed Sep. 27, 2015, which is incorporated herein by reference.

FIELD OF THE INVENTION

The present invention relates to a confocal microscope having a positionable imaging head mounted on a boom stand. The present invention is particularly useful in that the imaging head can readily be positioned by a user to direct the optics therein for imaging samples disposed upon a platform at the base of the boom stand, such as an excised tissue specimen or small animal, as well as be positioned by the user to direct the optics of the imaging head off such stand as may be useful for confocal imaging a sample disposed beside the boom stand, such as in-vivo skin tissue of large animals or humans. Further, the imaging head is removable from the boom stand for mounting on a different boom stand.

BACKGROUND OF THE INVENTION

Confocal microscopes optically section tissue to produce microscopic images of tissue sections without requiring histological preparation of the tissue on slides (i.e., slicing, slide mounting, and staining). Such sectional images produced may be on or under the surface of the tissue. An example of a confocal microscope is the VivaScope® manufactured by Caliber Imaging & Diagnostics, Inc. (formerly Lucid, Inc.) of Henrietta, N.Y. Examples of confocal microscopes are described in U.S. Pat. Nos. 5,788,639, 5,880,880, 7,394,592, and 9,055,867. In particular, U.S. Pat. No. 7,394,592 describes an imaging head of a confocal microscope mounted on a multi-positionable arm extending from an upright station having a computer system connected to the imaging head, where the computer system shows on a display confocal images captured by the microscope. While useful for imaging in-vivo tissue, such as a skin lesion without removal from a patient, it is cumbersome when one wishes to image ex-vivo tissue samples as may be mounted on a microscope stage. Other confocal microscopes have been developed for use in imaging ex-vivo tissue samples, such as may be mounted in tissue cassette holders, as described in U.S. Pat. Nos. 6,411,434, 6,330,106, and 7,227,630, or U.S. Patent Publication No. 2013/0222899. It would be desirable to provide a confocal microscope from a common platform which can be used both for imaging ex-vivo sample as mountable upon a stage and in-vivo tissue of a patient or animal.

SUMMARY OF THE INVENTION

Accordingly, it is an object of the present invention to provide a confocal microscope having an imaging head mounted on a boom stand in which the imaging head is positionable both for imaging samples disposed upon a platform at the base of the boom stand and beside such platform, thereby enabling ex-vivo imaging of samples as may be disposed on a stage upon the platform and in-vivo images of samples as may be disposed upon the platform or beside the platform.

It is another object of the present invention to provide a confocal microscope having a positionable imaging head mounted on an arm extending from the shaft of a boom stand where multiple degrees of freedom of motion are provided relative to one or more of the arm or shaft, such as to enable one or more of vertical, lateral, or rotational position adjustment of the imaging head.

A still further object of the present invention is to provide a confocal microscope having a positionable imaging head mounted on an arm of a boom stand in which the imaging head is rotationally mounted at the end of such arm.

It is another object of the present invention to provide a confocal microscope having a positionable imaging head which is releasably mounted to a boom stand so that the imaging head may be removed therefrom and mounted on a different boom stand, such as commonly used for traditional non-confocal optical microscopes.

Briefly described, the present invention embodies a confocal microscope having an imaging head with an optical system for capturing optically formed microscopic sectional images of a sample, where the optical system has at least an objective lens for focusing and collecting illumination from the sample, a boom stand having a post or shaft which extends along a vertical dimension from a platform at the base of the boom stand, and an arm extending along a horizontal dimension in which one end of the arm is mounted to the imaging head. A support member couples the arm to the shaft to at least enable the arm to be rotatable about the vertical dimension defined by the shaft. In a first mode of the microscope, the arm positions the imaging head to image a first sample, such as ex-vivo (e.g., excised) tissue specimen or small animal, disposed upon the platform, and in a second mode the arm is at least rotated about the vertical dimension to position the imaging head to image a second sample, such as in-vivo skin tissue of large animals or humans, disposed away from or beside the platform.

A stage having the first sample mounted thereto, such as in the case of excised tissue, may be provided upon the platform, where such stage is movable along x and y orthogonal dimensions. The arm supports the imaging head over the stage so that the optical axis of the objective lens is extendable along a z axis orthogonal to such x and y dimensions of the stage. The stage may be operated during the first mode to move such first sample with respect to the imaging head as desired to select along x and y dimensions where imaging by the imaging head within or on the sample is carried out at a desired depth selected along the z axis.

In addition to rotation of the arm about the vertical dimension, the support member may further enable adjustment of the arm along the vertical dimension to adjust height of the imaging head with respect to the platform (first or second samples, and stage if present), and/or enable adjustment of the arm laterally along the horizontal dimension, as desired in order to orient the imaging head for imaging of the first or second samples.

Preferably, the end of the arm is rotationally mounted to the imaging head to enable rotation of the head's housing about the horizontal dimension, such as by providing a rotational mounting shaft extending from the housing that is received and retained in a receptacle at the end of the arm so as to align the mounting shaft along the horizontal dimension. Such rotation of the imaging head enables selection of multiple rotational positions, where an origin rotational position aligns the optical axis of the objective lens with the z axis, and other rotational positions have the optical axis of the objective lens non-aligned with the z axis, as desired to orient the optical system with the particular sample to be imaged on the platform in the first mode, or off the platform in the second mode. Further, a carriage may be provided at the base of the imaging head for translating the imaging head along the optical axis of the objective lens relative to the mounting shaft. In this manner, the imaging head is positionable with multiple degrees of freedom of motion, such as lateral, vertical, and/or rotational adjustment, so that imaging head can be directed to image ex-vivo or in-vivo samples from a common platform from which the boom stand extends.

The mounting shaft extending from the imaging head is also preferably releasably retained in a receptacle of the boom stand's arm to enable removal of the imaging head from the arm for placement on another boom stand as desired. Such another boom stand may be as that described herein or other boom stand as desired by a user onto which the mounting shaft extending from the imaging head may be mounted.

While preferably the imaging head has an optical system operable by confocal microscopy, other modalities may be used to enable imaging of optically formed microscopic sectional images, such as OCT or two-photon microscopy.

BRIEF DESCRIPTION OF THE DRAWINGS

The foregoing objects, features and advantages of the invention will become more apparent from a reading of the following description in connection with the accompanying drawings, in which.

DETAILED DESCRIPTION ON THE INVENTION

Figure 1:
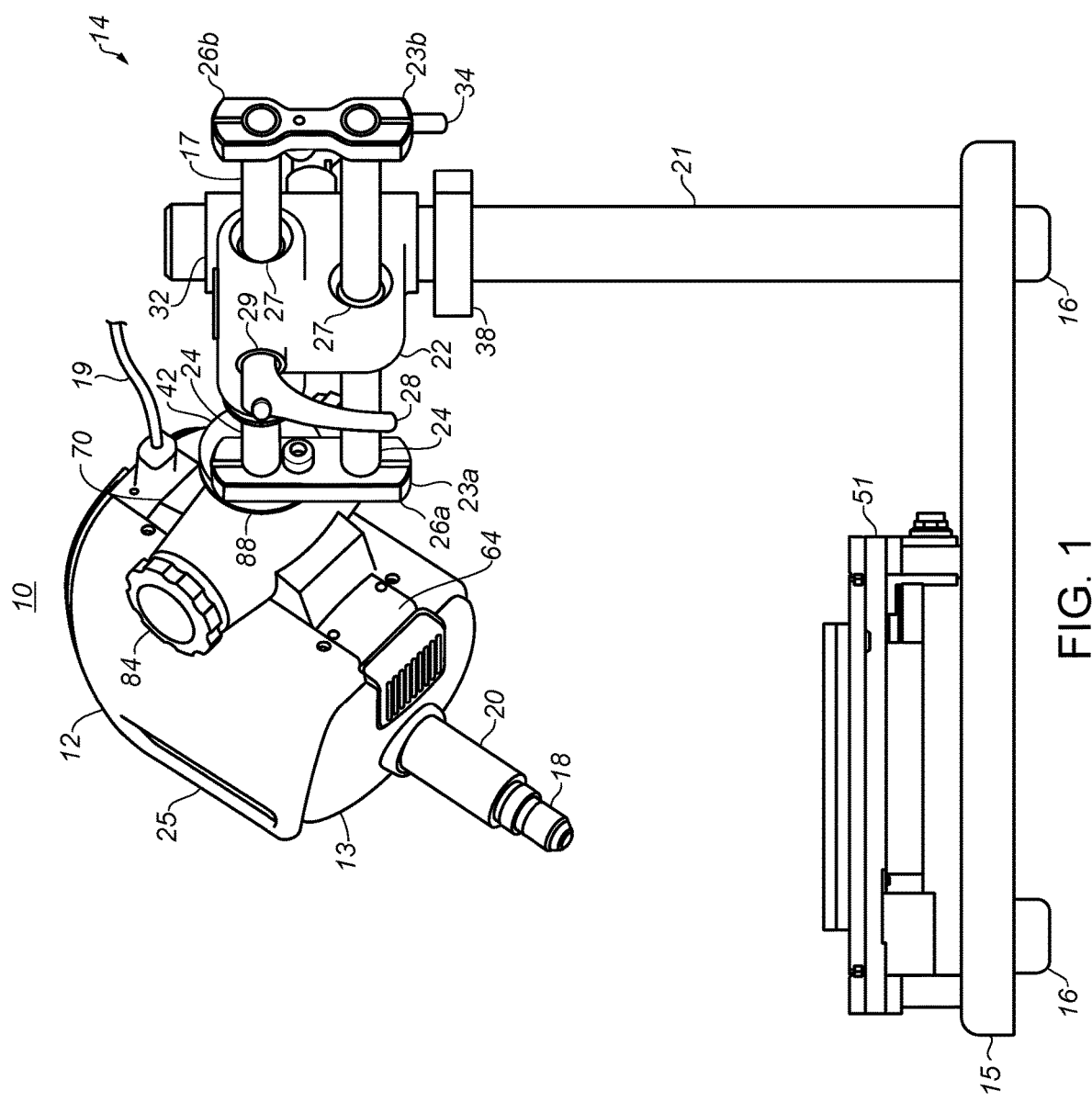
FIGS. 1 and 2 are two perspective views taken from opposite sides of the confocal microscope of the present invention showing the imaging head mounted to a boom stand that extends from a platform.
Figure 11:
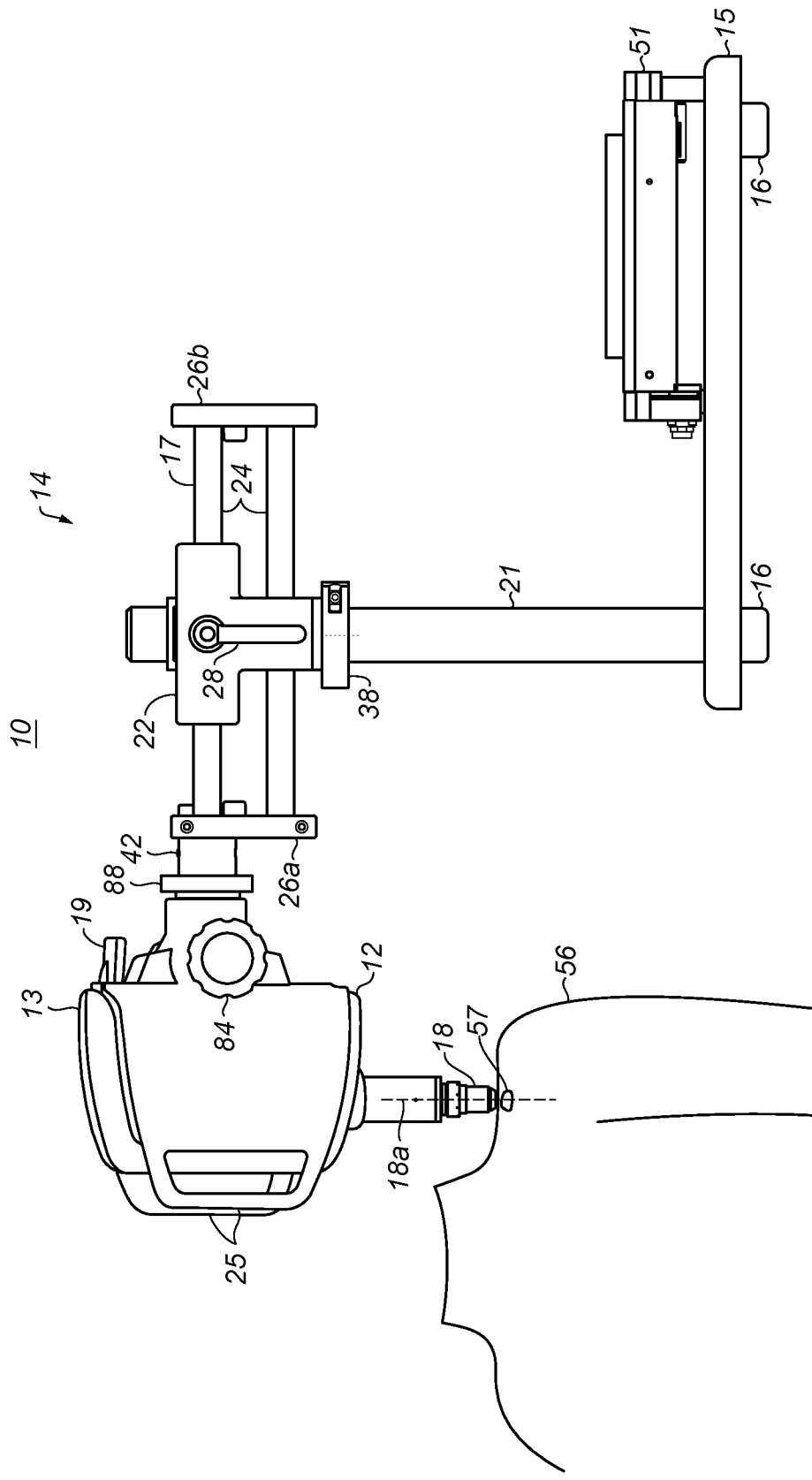
FIG. 11 is a side perspective view of the microscope of FIG. 1 in which the imaging head is shown moved to a position for imaging off or beside the platform of the boom stand in an example of imaging in-vivo skin tissue sample of a human.

Referring to FIGS. 1, 2, 3, 11 and 12, a confocal microscope 10 is shown having an imaging head 12, a boom stand 14 mounted to the imaging head 12, and a platform 15 providing the base of boom stand 14. Imaging head 12 has a housing 13 containing an optical system 60 (FIG. 4D) for confocal imaging via an objective lens 18 that extend from a projecting snout 20. Such snout 20 is shown in FIGS. 1 and 11. The optical system, electronics for enabling same within housing 13, the computer system of the confocal microscope 10, which is connected by a cable 19 to imaging head 12, and the display for viewing microscopic images of tissue samples from light focused and collected via the objective lens 18, are described in U.S. Pat. No. 9,055,867, which is incorporated herein by reference.

Figure 2:
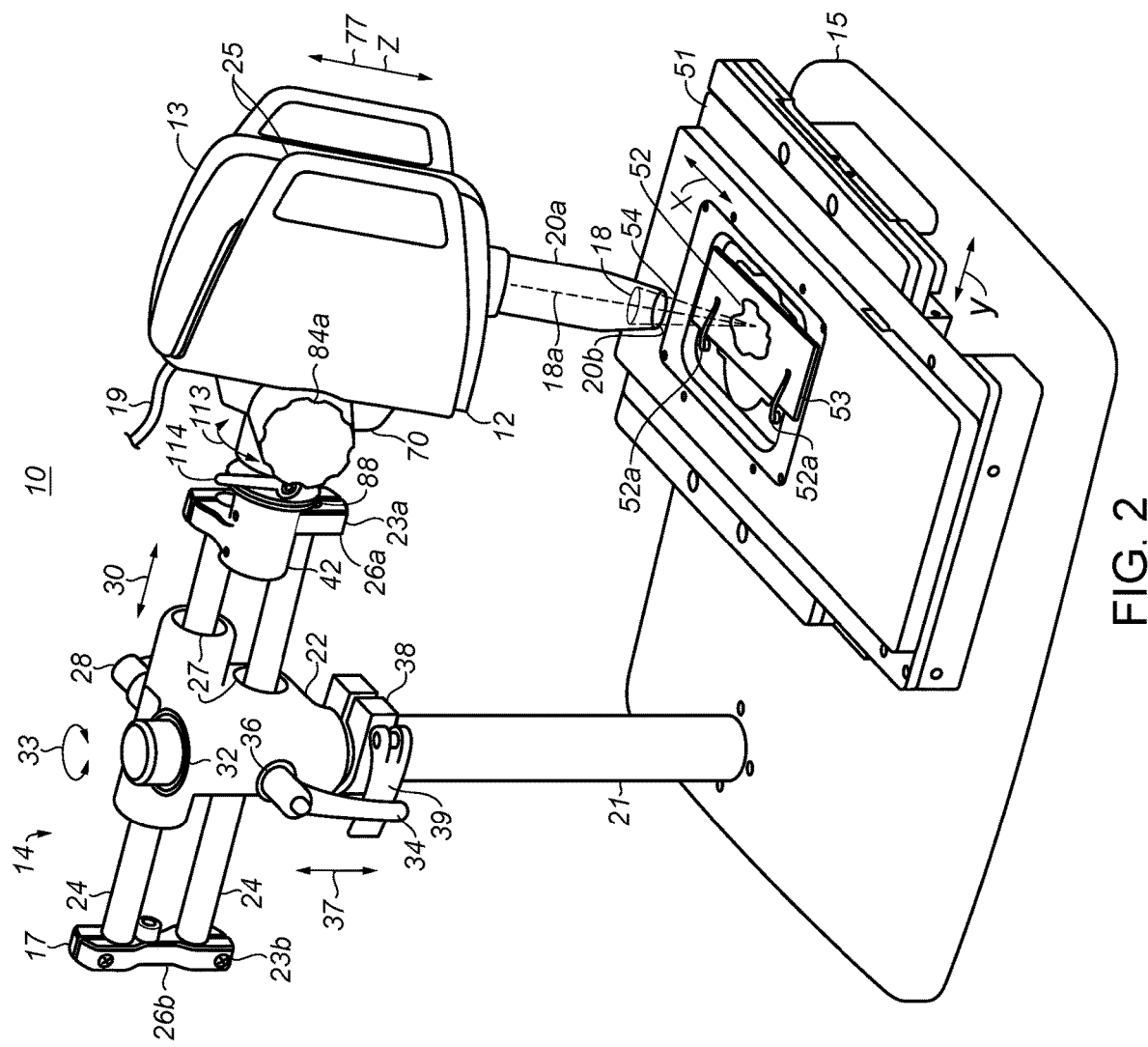
Figure 3:
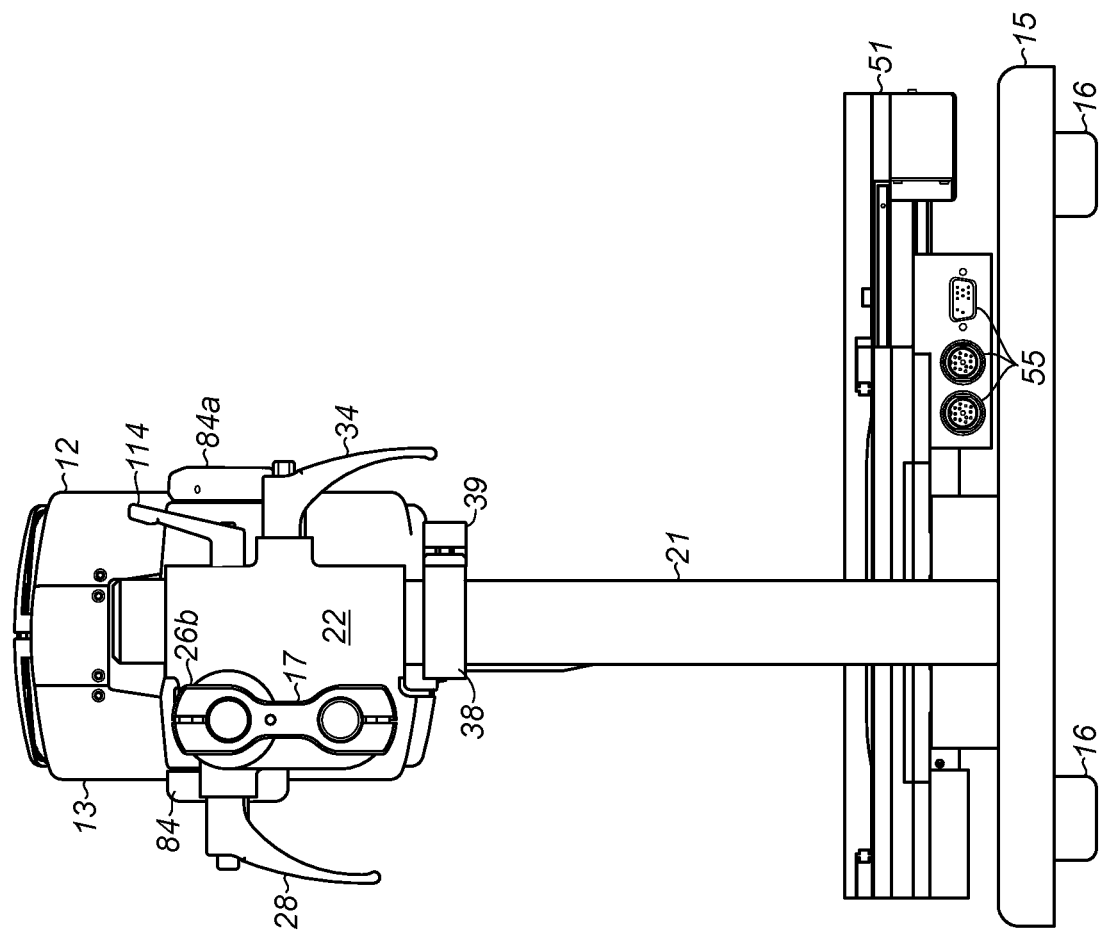
FIG. 3 is a rear view of the confocal microscope of FIG. 1.
Figure 4A:
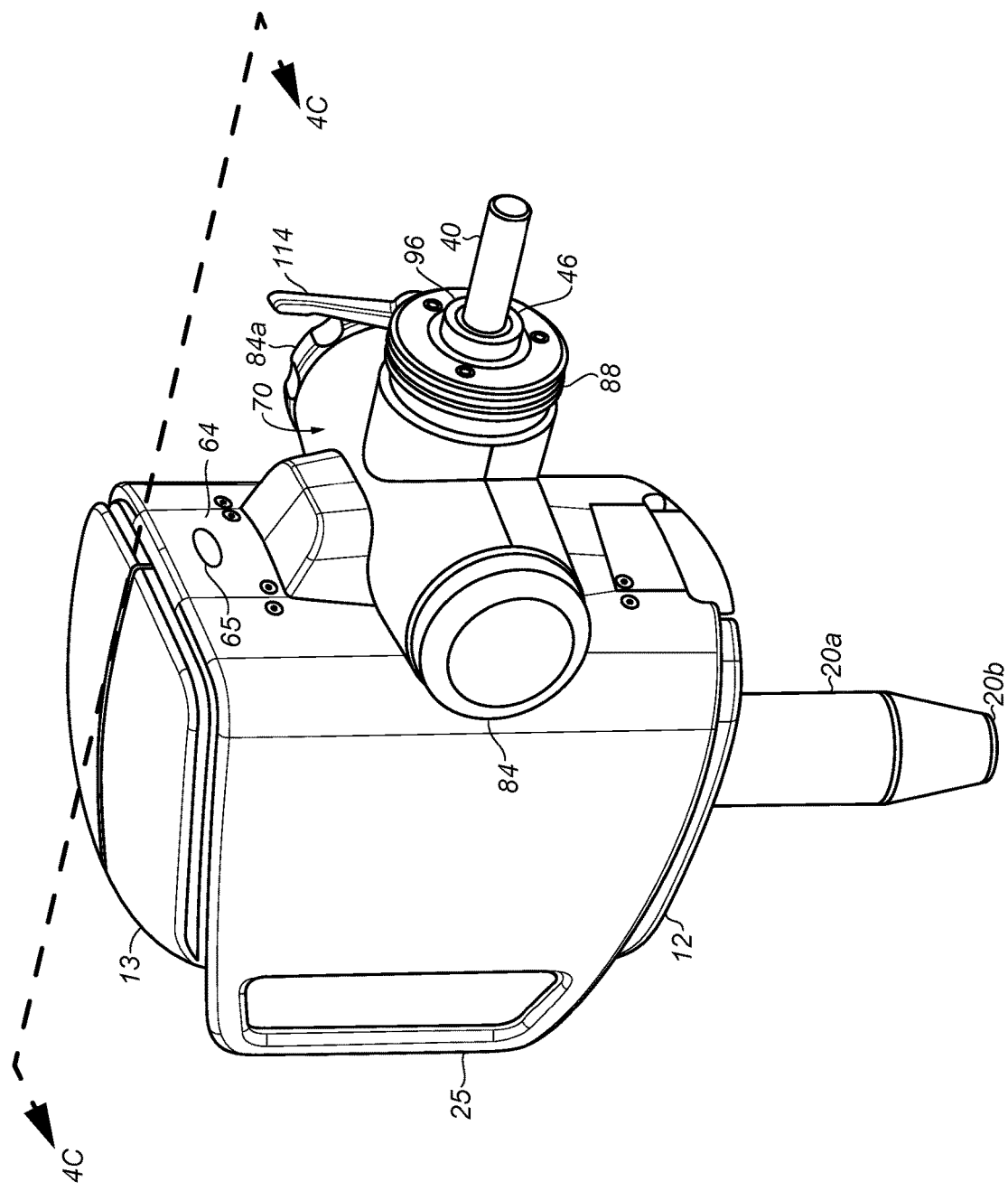
FIGS. 4A and 4B are perspective and bottom views, respectively, of the imaging head of FIG. 1 when removed from the boom stand.
Figure 4B:
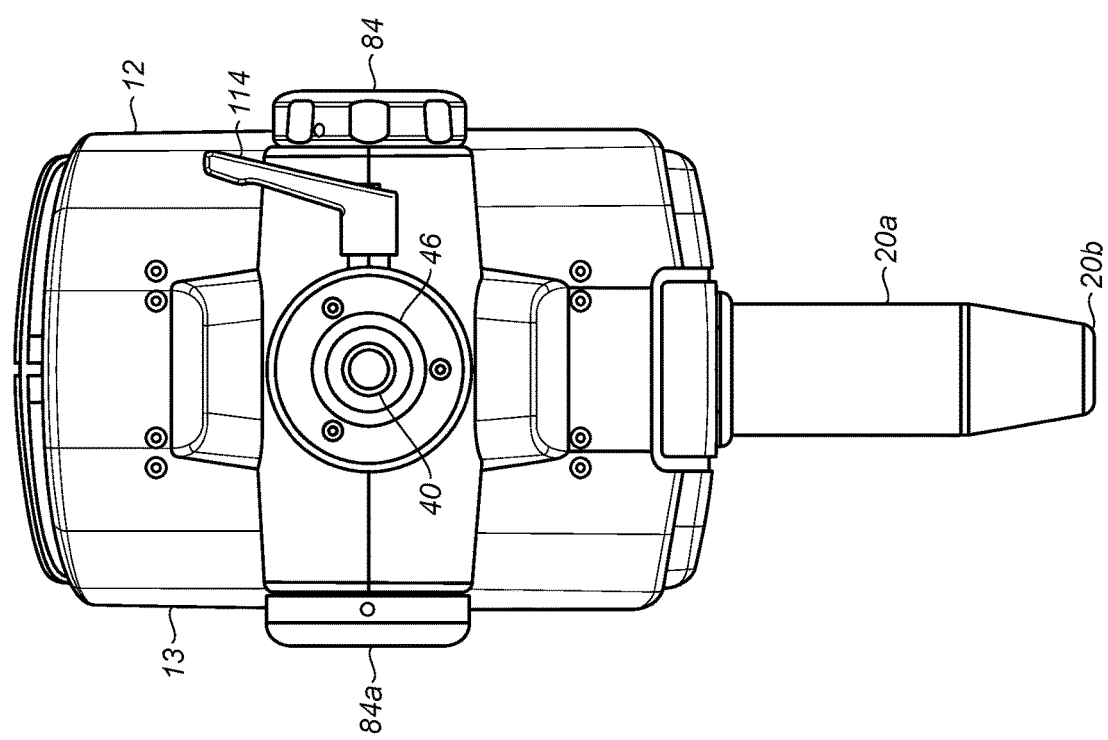
Figure 4C:
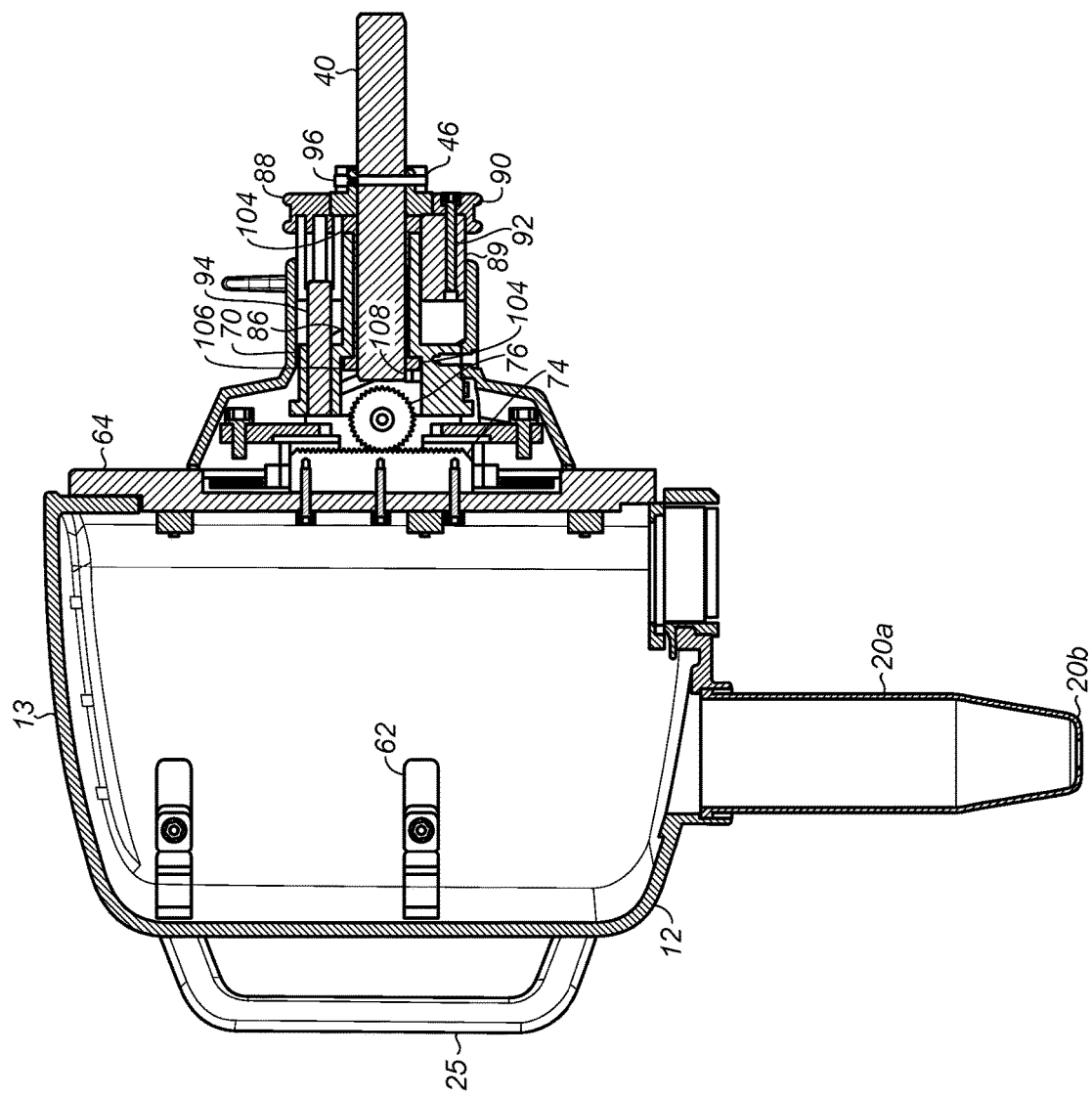
FIG. 4C is a cross-sectional view along lines 4C-4C of FIG. 4A.
Figure 12:
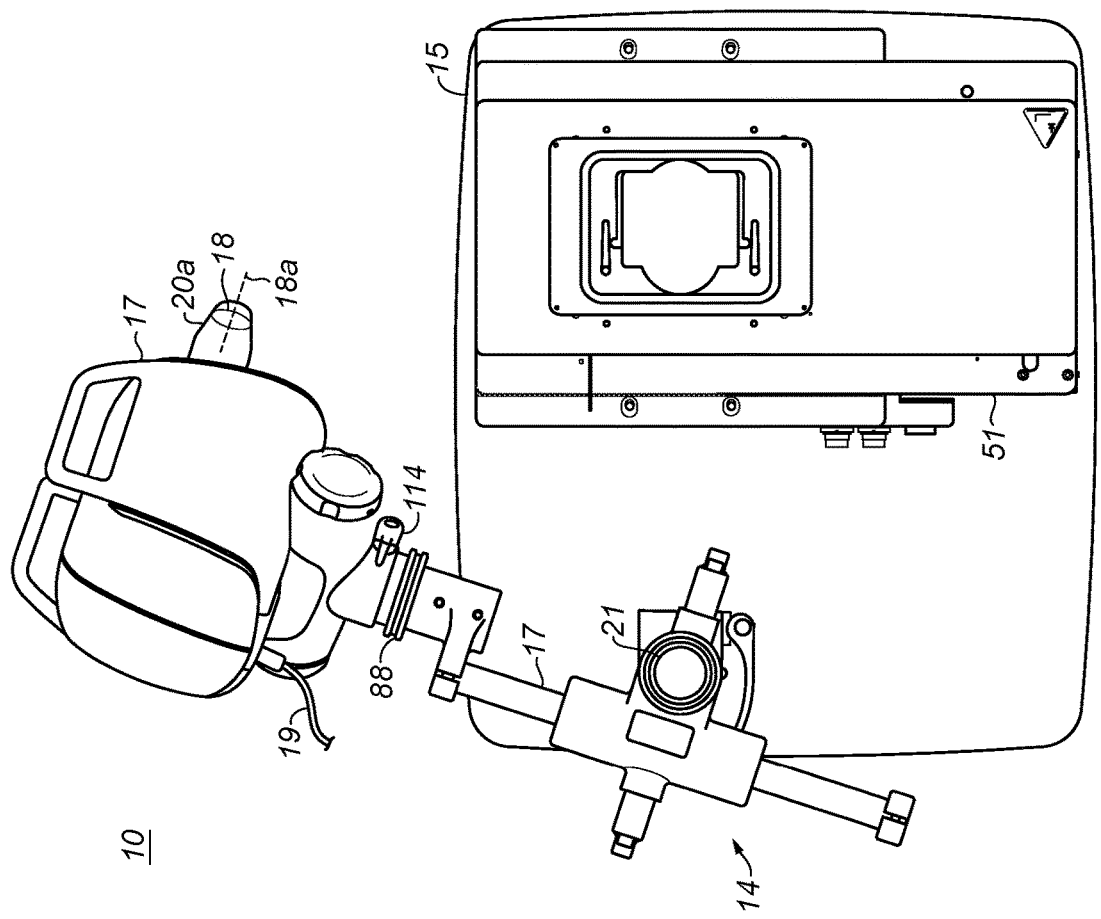
FIG. 12 is a top perspective view of the microscope of FIG. 1 in which the imaging head is shown moved to another position for imaging off or beside the platform of the boom stand.

For purposes of illustration, lens 18 is shown schematically in FIGS. 2 and 12 within an optional snout cover 20a. See also FIGS. 4A, 4B, and 4C. Snout cover 20a has at the end thereof a plate window 20b of optical transparent material, such as glass or plastic. Preferably, window 20b is thick, such as 1 mm. Cover 20a is shaped to extend over the snout 20 and objective lens 18 with imaging being carried out through window 20b. It is especially useful so that pressure may be applied by the window 20b against a surface of tissue being imaged, such as an in-vivo tissue sample, to assist in stabilization of the optical system of the imaging head 12 to such tissue to improve imaging performance.

Boom stand 14 has a shaft or post 21 extending from platform 15 along a vertical dimension, and an arm 17 mounted to post 21 by an arm support member 22 so that the arm 17 extends along a horizontal dimension and is positionable with respect to post 21 for vertical, horizontal, and rotational adjustment of the position of imaging head 12 mounted at end 23a of arm 17, as will be described in more detail below. Platform 15 has four feet 16 for supporting boom stand 14 on a surface, such as a table top. Arm 17 has two rods 24 which are fixed to each other at their ends by retainer members 26a and 26b at opposite ends 23a and 23b, respectively, of arm 17. The rods 24 extend through two horizontal openings 27 through support member 22. Ball bearings are preferably mounted along such openings 27 to assist in enabling rods 24 to slide there through so that arm can move horizontally as indicated by arrow 30 (FIG. 2). A locking lever 28 has a threaded shaft that extends in a threaded opening 29 in support member 22, via the upper one of openings 27, and rotated until its shaft engages the upper one of rods 24 to retain the horizontal position of arm 17 with respect to post 21. Turning the locking lever 28 in the opposite direction releases arm 17 so that it may be manually slide horizontally to a different horizontal position with respect to post 21.

Post 21 is received via a vertical opening 32 extending through support member 22, which may also have ball bearings to assist in enabling support member 22 and arm 17 to rotate together as indicated by arrow 33 about an axis that extends along the vertical dimension through post 21. A locking lever 34 has a threaded shaft that extends through a threaded opening 36 in support member 22, and rotated until it engages post 21 to retain the rotational position of the assembly of the support member 22 and arm 17 about the vertical dimension of post 21. Turning the locking lever 34 in the opposite direction releases it from the engagement with the post 21 so that the assembly of the support member 22 and arm 17 may be manually rotated to a different rotational position with respect to post 21 as desired.

Additionally when locking lever 34 is released, the assembly of support member 22 and arm 17 can move up and down along the vertical dimension of post 21 as indicated by arrow 37 to set the height of the arm 17 and the imaging head 12 coupled thereto. A quick release safety clamp 38 is disposed around post 21 below the bottom of opening 32 in abutment of support member 22 to assist in locking the vertical position of the assembly of the support member 22 and arm 17 along post 21. Lifting lever 39 of clamp 38 releases the clamp enabling the assembly of the support member 22 and arm 17 to slide up or down along the vertical dimension of post 21 (with locking lever 34 disengaged from post 21) to a different vertical (or height) position with respect to platform 15. When such vertical position is selected, clamp 38 is placed (such as slid along post 21) in abutment to support member 22 and lever 39 is pressed towards post 21 to clamp and retain the vertical position of support member 22 and arm 17 along post 21.

Figure 4D:
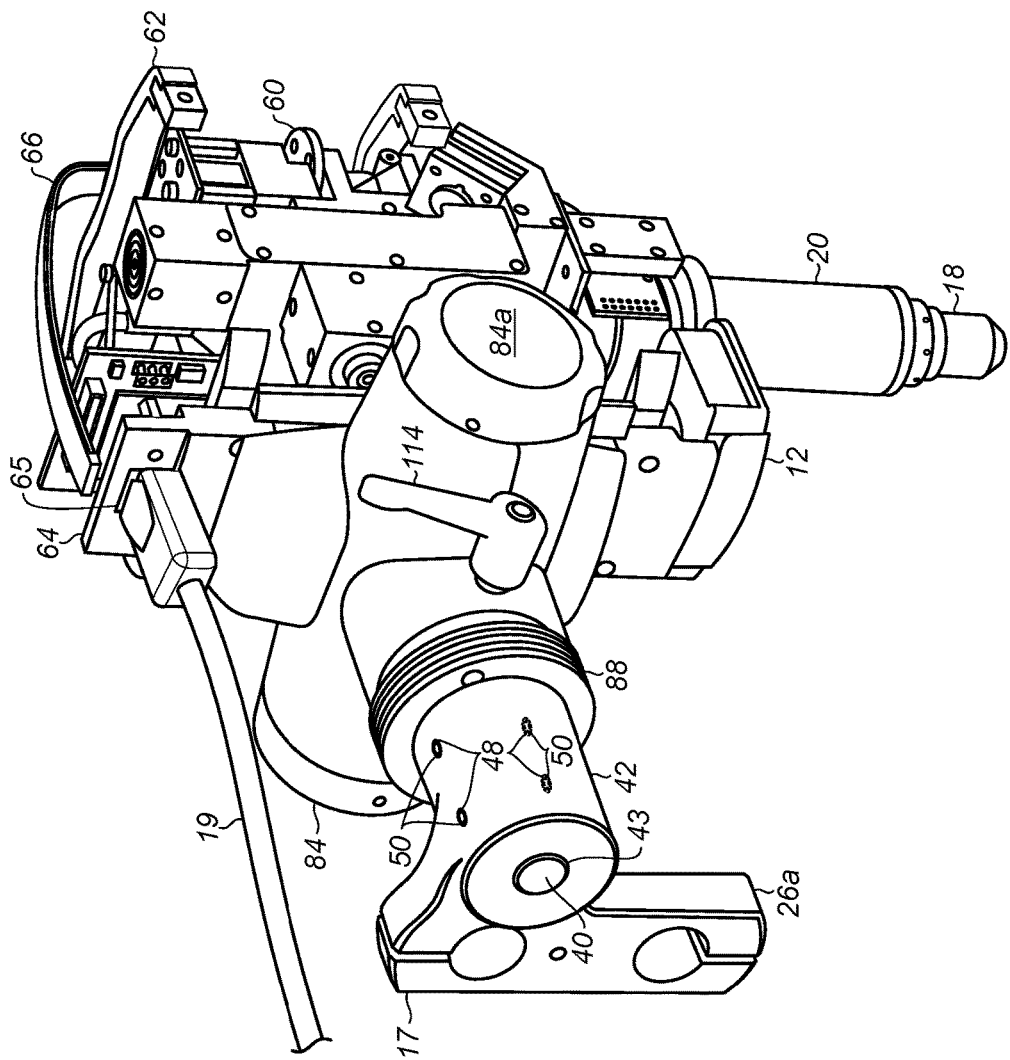
FIG. 4D is a perspective view of the imaging head of FIG. 1 coupled to the arm of the boom stand of FIG. 1 in which only part of the arm is shown and the outer case of the imaging head is removed to show the imaging optics and electronics of the microscope.
Figure 5:
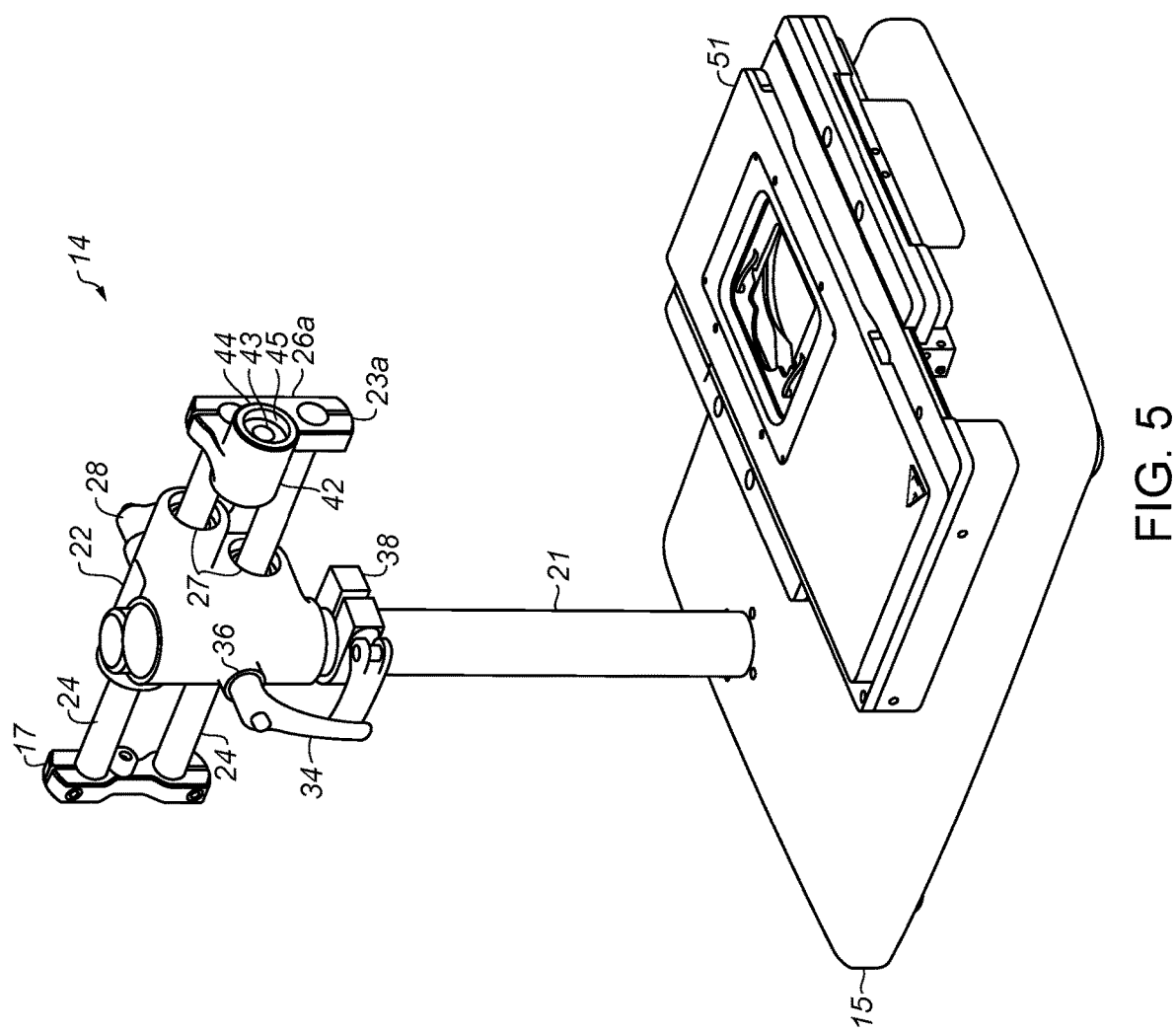
FIG. 5 is a perspective view of the boom stand of FIG. 1 with the imaging head removed.

As shown in FIGS. 4A, 4B, 4C, and 4D, a mounting shaft 40 extends from the base of imaging head 12. Extending from retainer member 26a at end 23a of arm 17 is a cylindrical receptacle 42 having an opening 43 of a diameter for receiving mounting shaft 40 as best shown in FIG. 5 when imaging head 12 is removed. Near end 44 of receptacle 42 such opening 43 has a larger diameter region 45 to receive an annular member 46 fixed around shaft 40. Annular member 46 seats along region 45 when shaft 40 is fully inserted in opening 43 as shown in FIGS. 4D and 6.

Figure 6:
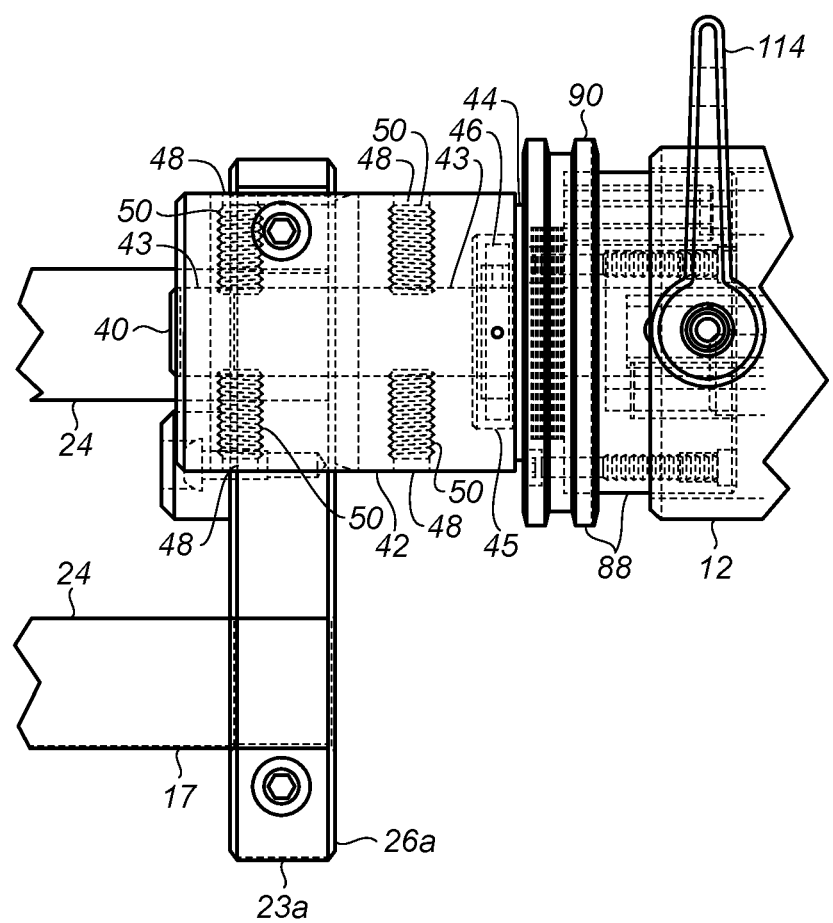
FIG. 6 is cross-sectional partial view of the arm of the boom stand and part of the imaging head mounted thereto showing the mounting shaft of the imaging head received in a receptacle cylinder at the end of the horizontal arm, and screws for tilt adjustment of the imaging head with respect to the arm.

To retain mounting shaft 40 in opening 43 of the receptacle 42 once inserted, four threaded openings 48 are provided for receiving retainer screws 50, where two of the openings 48 are along the top of receptacle 42 and the other two of openings 48 are along the bottom of receptacle 42, as best shown in FIG. 6. Each opening 48 receives retainer screw 50 which engages the mounting shaft 40 to fix the mounting shaft 40 stationary within the receptacle 42. Adjusting the location of abutment with shaft 40 by each of the retainer screws 50 also enables horizontally leveling (or substantially leveling) of the mounting shaft 40 to arm 17, where receptacle 42 extends along the horizontal dimension defined by arm 17. Preferably, when imaging head 12 is at an origin rotational position with respect to its mounting shaft 40 captured in receptacle 42, objective lens 18 should be directed so that the optical axis 18a (FIGS. 2, 11 and 12) of objective lens 18 is perpendicular with the horizontal upper surface or plane of platform 15. Further, a target or features may be placed on the platform in view of objective lens to assist in electronic calibration in confocal images as such screws 50 are adjusted to assure fine horizontal levelling of imaging head with respect to platform 15, and particularly to and an x-y translation stage 51 mounted upon such platform 15 for moving a sample along x-y axes that extend parallel such horizontal level.

For example, the support member 22, arm 17 and its cylindrical receptacle 42, and locking levers 28 and 34, are components of a Dual Linear Ball Bearing Arm Assembly, Catalog No. OS1010H-16DD, sold by Old School Industries of Dacono, Colo., USA, and post 21 may be a 1.5 inch diameter stainless steel cylinder which is 16 inches in length. Rods 24 are made to be of a length so that the distance between ends 23a and 23b of arm 17 establishes a range of horizontal positions over platform 15 by imaging head 12 upon end 23a of arm 17. Other boom stands may be used having a cylindrical receptacle or other mounting member shaped to receive or engage mounting shaft 40. Further, mounting shaft 40 for example may be ⅝ inches in diameter. Although boom stand 14 is preferred, mounting shaft 40 may be removed and located in a different boom stand which may have different positioning mechanisms than shown for boom stand 14. For example, such different boom stands may have a single horizontal member, rather than two horizontal members of rods 24 providing arm 17, positionable with respect to a post mounted to a platform.

Figure 7:
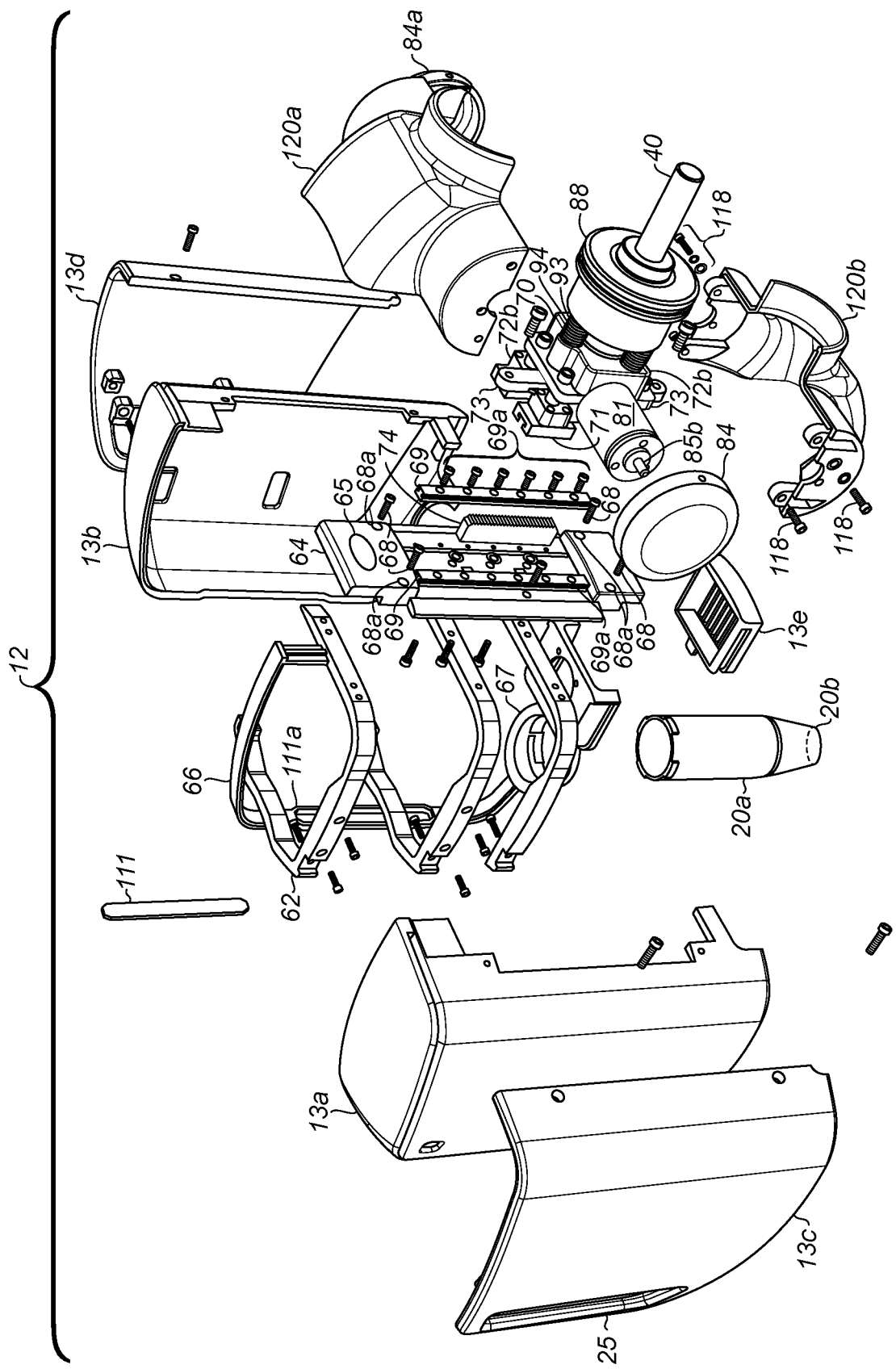
FIG. 7 is an exploded perspective view of the assembly of the imaging head of FIG. 1 with the imaging optics and electronics of the microscope within the imaging head removed.

Referring to FIG. 7, an exploded view of the assembly of the confocal imaging head 12 is shown with the optical system removed for purposes of illustration. The optical system 60 (best shown in FIG. 4D with housing 13 removed) is mounted in a cage 62 to the back of a plate 64 by screws 68 through holes 68a in plate 64 to holes in cage 62. A rib 66 extends along the outside of cage 62 to a ring 67 for supporting the snout cover 20a when present, and may have an opening 111a for an optional LED window 111. Housing 13 is composed of two inner shell housing portions 13a and 13b which mate together to enclose cage 62 and rib 66, and two outer housing portions 13c and 13d which mount along the exterior of inner housing portions 13a and 13b, respectively. Outer housing portions 13c and 13d each provide one of the two handles 25.

A carriage 70 is mounted along the front of plate 64 which moves the optical system of the imaging head 12 relative to shaft 40 so that carriage 70 is rotatable about mounting shaft 40 using a movable collar 88 to one or more selected rotational positions, and carriage 70 is movable along a plate member by rails 69 mounted to the plate 64 along optical axis 18a. Carriage 70 represents an assembly having an optical axis translation subassembly 70a (FIG. 10) and a rotation subassembly 70b (FIGS. 9A and 9B), where FIG. 8 shows the two subassemblies 70a and 70b prior to their assembly to each other.

Figure 10:
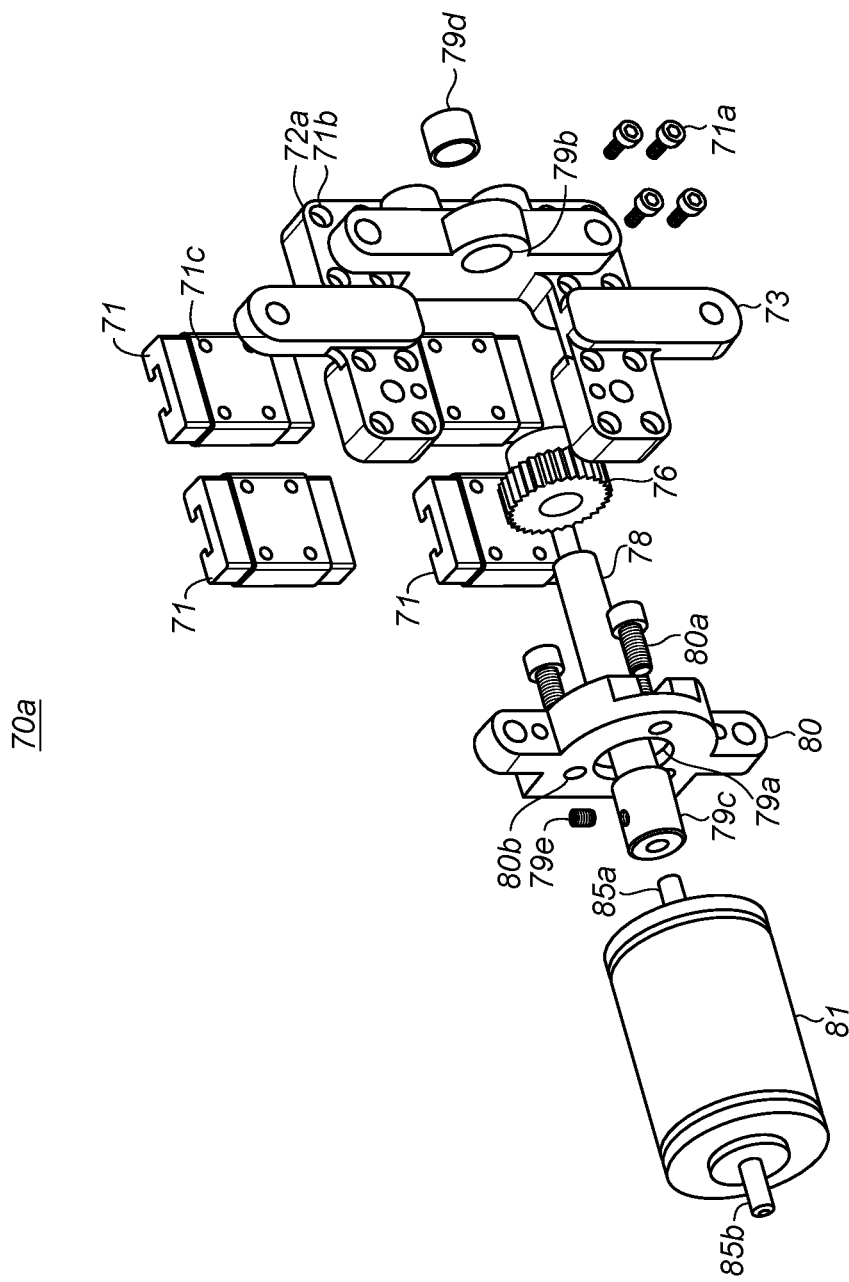
FIG. 10 is an exploded perspective view of the optical axis translation subassembly of the carriage of FIGS. 7 and 8 for moving the carriage along the optical axis of the objective lens.

Two linear rails 69 are mounted by screws 69a to plate 64, such as received into threaded holes along plate 64, for use by optical axis translation subassembly 70a. For purposes of illustration, only one set of screws 69a is shown in FIG. 7. The translation subassembly 70a has a first platform 72a having four slot guides 71 mounted thereto, each by four screws 71a via holes 71b in first platform 72a into threaded holes 71c along each guide 71, so that a pair of vertical disposed slot guides 71 rides along each rail 69. For purposes of illustration, only one set of four screws 71a is shown in FIG. 10. A linear rack 74 (FIG. 7) is mounted to plate 64 between rails 69. Such rack 74 has teeth with engages teeth of a gear or pinon 76 (FIGS. 4C, 8 and 10) which is mounted along a shaft 78 journaled to platform 72a via a hole 79a in flange 80 and a hole 79b in platform 72a, as best shown in FIG. 10. A coupler 79c is provided at the end of shaft 78 in hole 79a of flange 80 and receives an output shaft 85a of a gear box 81. The end of shaft 85b is fixed to engage and rotate shaft 79, such as by using a screw 79e receiving via a side hole of coupler 79c into hole or slot at the end of shaft 85a, but other mechanism for rotational coupling to the gear box may be used. A retaining bushing 79d is provided along the other end of shaft 78a passing through hole 79b. Gear box 81 is coupled to flange 80 by screws 80a received in threaded holes along gear box 81 via holes 80b in flange 80. The gear box is coupled to rotate shaft 78 responsive to rotation of the gear box input shaft 85b.

A knob 84 is attached to gear box shaft 85b so that rotation of knob 84 is coupled by gear box 81 to enable smooth movement of gear 76, via rotation of shaft 78, which move the plate 64 up and down with respect to carriage assembly 70. The other end of shaft 78 opposite knob 84 is an optional knob 84a that may be coupled to end of shaft 78 passing through opening 79b of first platform 72a to provide a brake for rotation of shaft 85b. Linear rack 74 extends parallel to the optical axis 18a of objective lens 18 to enable translation of the plate 64 and the entire optical system 60, including its objective lens 18, along optical axis 18a responsive to movement of gear 76 along rack 74, as indicated by arrow 77 (FIG. 2). Upper and lower stop members 73 may be provided which extend from first platform 72a and define the extent of travel up and travel down of entire carriage 70. Upper and lower stop members 73 abut the top and bottom of rack 74 when carriage 70 is at its uppermost and lowermost positions, respectively.

Figure 8:
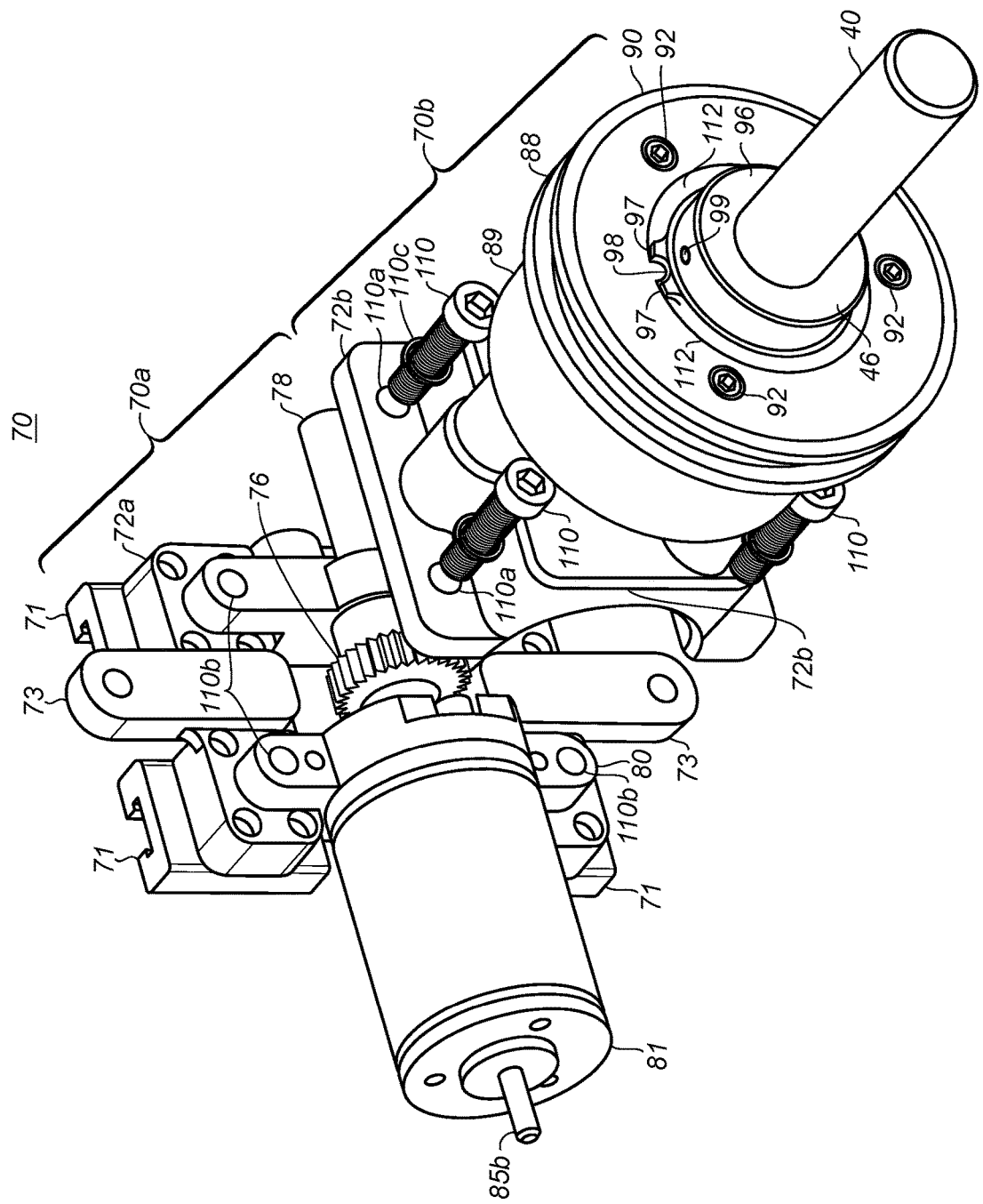
FIG. 8 is a perspective view of the carriage of FIG. 7 for moving and rotating the optical system of the imaging head relative to the shaft mounting of the imaging head.

The rotation subassembly 70b has a second platform 72b which mounts to the first platform 72a as shown in FIG. 8 by four screws 110 into holes 110a and 110b in platforms 72a and 72b, respectively. Washers 110c may be provided along such screws 110. The bottom of second platform 72b has curvature to provide clearance for gear box 81 and shaft 78 which are located between the first and second platforms 72a and 72b. Second platform 72b has a cylindrical portion 86 (FIG. 9A) along which rides a movable collar 88. The movable collar 88 is an assembly of a lower cylindrical portion 89 and an upper cylindrical portion 90 mounted by three screws 92 to each other. The lower cylindrical portion 89 has three openings 91 which receive and retain three guide shafts 94 extending from the second platform 72b outside cylindrical portion 86. Each guide shaft 94 has a coil spring 93 with two spring centering bushings 95.

The mounting shaft 40 has an index gear 96 (FIG. 9A) with two teeth 97 which engages a tooth or projection 98 extending from the inner surface of upper cylindrical portion 90 when mounting shaft 40 is received through collar 88, and springs 93 bias collar 88 forward to maintain engagement of projection 98 which aligns with a slot formed between two of teeth 97. Gear 96 is fixed to mounting shaft 40 by a pin 99 which extends through a hole 100 extending through gear 96 and a hole 101 extending through shaft 40. Annular member 46 described earlier is provided by the front portion of gear 96. Three wave washer 102 are provided along shaft 40 with a washer 103. Mounting shaft 40 extends through collar 88 and cylindrical portion 86, via two bushings (or flange bearings) 104 received in each end of cylindrical portion 86. A locking ring 106 engages an annular groove at the end of the shaft 40, via a washer 108, to retain the shaft 40 so that projection 88 engages between teeth 97 under bias of springs 93 as shown in FIG. 9B. With mounting shaft 40 retained between collar 88 and ring 106, the first and second platforms 72a and 72b are attached to each other by screws 110. Two lower housing portions 120a and 120b enclose the carriage 70 and are coupled by fixing elements 118, such as screws, washer, and nuts, via holes 119 in lower housing portions 120a and 120b. Additional screws and fasteners may be used to mount the components of the imaging head 14 together, such as shown in FIG. 7. A hole 65 in plate 64 is provided for cable 19 to the optical system 60. The housing 13 further has a fan cover 13e for a fan that may be present in the optical system 60.

Figure 9A:
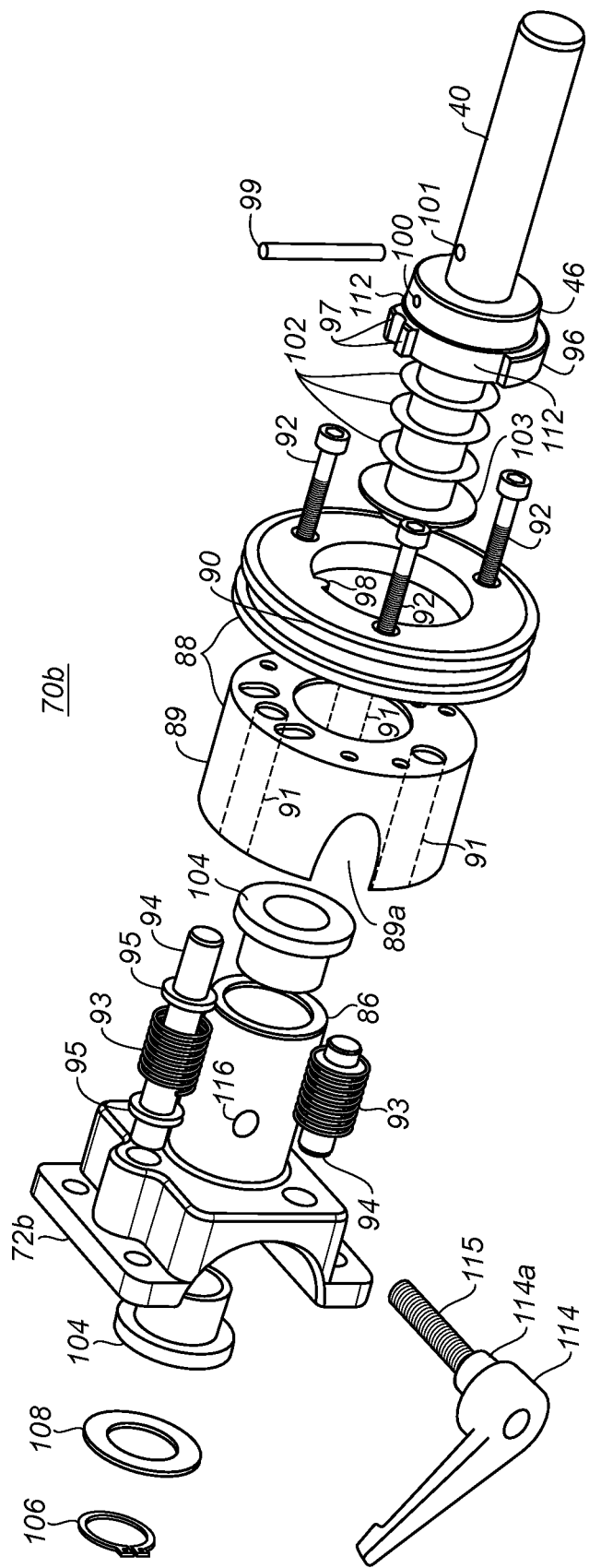
FIGS. 9A and 9B are exploded and assembled perspective views, respectively, of the rotation subassembly of the carriage of FIGS. 7 and 8 for rotating the imaging head relative to the mounting shaft.
Figure 9B:
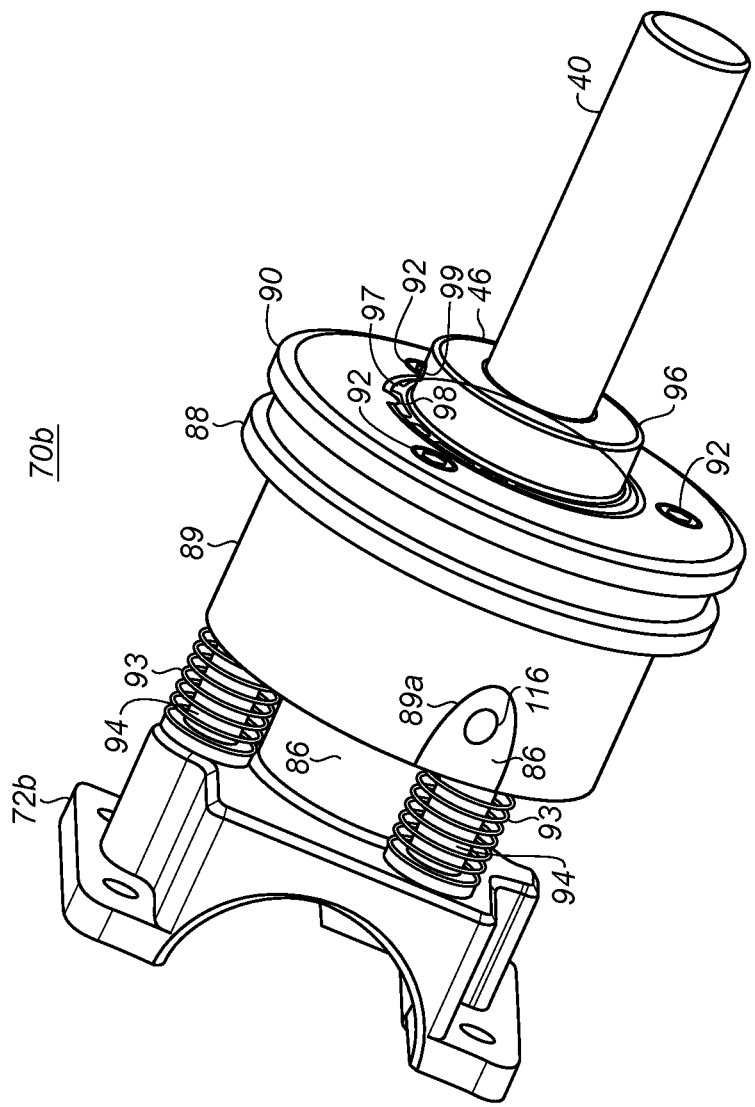

To rotate the carriage 70 around the mounting shaft 40, collar 88 is manually pulled back away from gear 96 along guide shafts 94 against the bias of spring 93 until projection 98 disengages from the slot between teeth 97 of gear 96, the collar 88 is then manually rotated clockwise or counterclockwise (depending on the desired rotation) away from teeth 97, and then released so that projection 98 extends forward into one of two region 112 on each side of teeth 97 (FIG. 9A). Regions 112 extends 180 degrees along the outer periphery of gear 96, where the slot between teeth 97 represents the origin rotational position defining where the imaging head 12 is oriented perpendicular to platform 15, i.e., the objective lens optics axis 18a is perpendicular as calibrated using screws 50, as described earlier. Thus, when mounting shaft 40 is mounted to receptacle 42 of the boom stand 14, the entire carriage 70 can be rotated about an axis extending longitudinally through the center of shaft 40 as indicated by arrow 113 (FIG. 2). To retain a selected rotational position when projection 98 of collar 88 is not engaged with teeth 97, a locking lever 114 is provided having a threaded shaft 115 received in threaded hole 116 of lower cylindrical portion 86 to engage the surface of shaft 40, via an opening 89a in lower cylindrical portion 89, as shown in FIG. 9A. To select a different non-origin rotational position, the locking lever 114 is rotated to disengage shaft 115 from shaft 40 prior to moving and rotating collar 88. Preferably, the locking lever 114 has a spring loaded handle portion 114a with a ratchet therein that engages for rotating shaft 115 when pushed in and disengage when pulled out. This allows a user to relocate the angle of handle portion 114a to reengage shaft 115 as needed to apply rotation to shaft 115. Less preferably, additional teeth 97 may be optionally provided as shown in FIG. 9B into which projection 98 from collar 88 can be selectively received at different rotation positions of carriage 70 about shaft 40. Example of imaging head 12 in non-origin rotational positions are shown in FIGS. 1 and 12, and in the origin rotational position in FIGS. 2 and 3.

With the imaging head 12 mounted to receptacle 42 of arm 17 of boom stand 14 and properly aligned using screws 50, the imaging head 12 is now manually positionable using handles 25, which extend from housing 13, by boom stand 14 along lateral, rotational, and vertical dimensions or directions as indicated by arrows 30, 33, and 37, respectively, and may be retained by levers 28, 34, and 39 at selected lateral, rotational, and vertical position with respect to platform 15 to direct imaging head 12 as desired towards samples on or off platform 15. Also, the imaging head 12 is manually rotatable about mounting shaft 40 as indicated by arrow 113, and can move along the optical axis 18a, as indicated by arrow 77. Thus, mechanisms have been described above for positioning imaging head 12 along a plurality of degrees of freedom.

In a first mode, imaging head 12 can readily be positioned by a user to direct the objective lens 18 of the imaging head 12 for imaging samples, such as ex-vivo non-histologically prepared tissue sample 52 disposed upon stage 51 upon platform 15. FIG. 2 shows an example of operation of imaging head 12 in such first mode. Laser illumination scanned and collected by objective lens 18 is depicted by light rays 54, where collected light by the lens is representative of a tissue section at a cellular level below the surface of the sample 52 facing objective lens 18. Block 53 may represent a substrate, such as of glass or plastic, or a cassette which retains the sample 52 in a desired orientation, with clips 52a to fix block 53 upon stage 51. Stage 51 may be a typical translation stage for moving sample 52 along x and y orthogonal dimensions (see arrows labelled x and y in FIG. 2), and preferably is coupled by one or more cables to ports 55 (FIG. 3) to the computer system operating microscope 10 to control x and y drive motor positions enabling the user to select different locations for capturing confocal images of sample 52. Other mechanisms for retaining a sample onto stage 51 than shown may be used for presenting such sample to the optical system of imaging head 12.

The imaging head 12 can be positioned so that optical axis 18a of objective lens 18 aligns with a z axis orthogonal to x and y dimensions of stage 51, such as by selecting the origin rotational position of shaft 40 with respect to carriage 70. While depth along the z axis (distance or height of the objective lens from stage 51) may be controlled by motion along arrow 77 using knob 84, preferably a motor within the imaging head as described in the above incorporated patent, provides finer translation along the z direction. However, imaging head 12 may also be rotated to non-origin rotational positions where optical axis 18a is at non-orthogonal angles with respect to x and y dimensions of stage 51, as desired by the user. Although stage 51 is shown, other stages for moving any sample, ex-vivo or in-vivo, may be mounted upon platform 15, and used to orient sample with respect to imaging head 18. Samples may also be positioned on platform 15 for imaging by imaging head 12 without stage 51, such as may be useful for imaging in-vivo tissue samples of small animals.

In a second mode, imaging head 12 may be positioned using handles 25 to direct objective lens 18 off or away from platform 15, such as beside platform 15 as shown in FIG. 11 for example of a skin lesion 57 on a patient body 56. Laser illumination scanned and collected by objective lens 18 is depicted by light rays 54, where collected light by the lens is representative of a tissue section at a cellular level below the surface of the sample 57 facing objective lens 18. The patient body 56, or other subject not located upon platform 15, may thus be disposed beside or near the boom stand 14. Although not shown, the optional snout cover 20a may be used in FIG. 11. Depending on the orientation of the skin lesion 57 with respect to the imaging head 12, in addition to adjusting the rotation of arm 17 along arrow 33, the height of the imaging head along arrow 37 and/or rotation thereof relative to the arm 17 along arrow 113 may also need to be adjusted. Another example of imaging head 12 positioning in this mode is shown in FIG. 12 with snout cover 20a.

Although all of such degrees of freedom of motion as provided by the boom stand 14 is preferred as indicated by arrows 30, 33, and 37 of FIG. 2, less than all may optionally be provided for positioning the imaging head, such as by at least enabling rotation of arm 17 (arrow 33), and preferably also rotation of imaging head 12 with respect to arm 17 (arrow 113) between origin and non-origin rotational positions.

Further, although imaging head 12 is described herein having an optical system for capturing optically formed microscopic sectional images of a sample operative by confocal microscopy, other modalities for imaging optically sectioned microscopic images of sample may be incorporated in imaging head 12 by optical coherence tomography or interferometry, such as described in Schmitt et al., "Optical characterization of disease tissues using low-coherence interferometry," Proc. of SPIE, Volume 1889 (1993), or by a two-photon laser microscopy, such as described in U.S. Pat. No. 5,034,613.

From the foregoing description, it will be apparent that a confocal microscope having a positionable imaging head mounted on a boom stand has been provided. Variations and modifications in the herein described confocal microscope, and system and method for mounting an imaging head of such microscope to a boom stand in accordance with the invention will undoubtedly suggest themselves to those skilled in the art. Accordingly, the foregoing description should be taken as illustrative and not in a limiting sense.

The invention claimed is:

1. A microscope comprising:
   a housing having an optical system for imaging optically formed microscopic sectional images;
   a platform for supporting a shaft extending along a vertical dimension;
   an arm extending along a horizontal dimension, in which said arm has one end mounted to said housing;
   a support member coupling said arm to said shaft to enable said arm to be rotatable about said shaft, in which in one mode said arm positions said housing over said platform to enable said optical system to image a first sample disposed upon said platform, and in another mode said arm is at least rotated about said vertical dimension to position said housing to enable said optical system to image a second sample beside said platform, wherein said one end of said arm is rotationally mounted to said housing to enable rotation of said housing about said arm.

2. The microscope according to claim 1 further comprising a stage upon said platform movable along x and y orthogonal dimensions, and said optical system comprising at least an objective lens for focusing and collecting illumination, in which said objective lens has an optical axis extendable along a z axis orthogonal to said x and y dimensions, in which said first sample is mounted to said stage during said one mode.

3. The microscope according to claim 1 wherein said support member enables adjustment of said arm along said vertical dimension.

4. The microscope according to claim 1 wherein said support member enables adjustment of said arm laterally along said horizontal dimension.

5. The microscope according to claim 1 wherein said imaging head is manually positionable in said first and second modes.

6. The microscope according to claim 1 wherein said one mode enables said optical system to image said first sample representing an ex-vivo sample upon the platform, and said another mode enables said optical system to image said second sample representing in-vivo sample beside said platform.

7. The microscope according to claim 1 wherein said optical system operates by confocal microscopy for capturing optically formed microscopic sectional images of one of said first and second samples in which one or more of said images are captured below a surface of said one of said first and second samples.

8. A microscope comprising:
   an imaging head having an optical system for capturing optically formed microscopic sectional images of a sample, said optical system comprising at least an objective lens for focusing and collecting illumination from the sample, in which said objective lens has an optical axis;
   a horizontally disposed stage having the sample mounted thereto, said stage being movable along x and y orthogonal dimensions; and
   a boom stand supporting said stage and having an arm attached to said imaging head for supporting said imaging head over said stage so that said optical axis of said objective lens is extendable along a z axis orthogonal to said x and y dimensions, wherein said arm has a receptacle at one end thereof, said imaging head has a mounting shaft received and retained in said receptacle, and said imaging head being mounted to said mounting shaft for enabling alignment of said optical axis with said z axis, and said imaging head is mounted to said mounting shaft to enable rotation about a longitudinal axis of said mounting shaft to enable selection of plurality of rotational positions, in which a first one of said rotational positions aligns said optical axis with said z axis, and second ones of said rotational positions are provided wherein said optical axis is non-aligned with said z axis.

9. The microscope according to claim 8 further comprising a locking member which engages said mounting shaft to maintain said mounting shaft in one of said rotational positions.

10. The microscope according to claim 8 wherein said imaging head comprises a carriage mounted to said mounting shaft for enabling said rotation about said mounting shaft.

11. The microscope according to claim 10 wherein said carriage translates said imaging head along said optical axis relative to said mounting shaft.

12. The microscope according to claim 8 wherein said boom stand has a platform supporting said stage, a vertical shaft extending from said platform, and said vertical shaft is coupled to support said arm in one mode to position said imaging head over said platform, and said arm is coupled for rotation about said vertical shaft to position said imaging head in another mode away from extending over said stage to image another sample not mounted upon said stage.

13. The microscope according to claim 12 wherein said arm is movable horizontally with respect to said vertical shaft.

14. The microscope according to claim 8 wherein said imaging head has handles for manually positioning said imaging head.

15. The microscope according to claim 8 wherein said mounting shaft is releasably retained in said receptacle to enable removal of said imaging head from said arm for placement on another boom stand.

16. The microscope according to claim 8 wherein said imaging head operates by confocal microscopy for capturing said optically formed microscopic sectional images of the sample.

17. A microscope comprising:
an imaging head having an optical system for imaging optically formed microscopic sectional images;
a stand for supporting a shaft from a platform, and an arm which extends along a horizontal dimension from said shaft, wherein said arm is coupled to said imaging head;
means for positioning said imaging head along a plurality of degrees of freedom of motion relative to one or more of said arm and said shaft, wherein at least one of said plurality of degrees of freedom of motion enables rotation of said imaging head about said arm;
said imaging head being operable in a first mode and a second mode, and in said first mode said means moves said imaging head over said platform to enable said optical system to image a first sample disposed upon said platform, and in said second mode said means moves said imaging head to image a second sample disposed away from said platform.

* * * * *